(12) United States Patent
Patel

(10) Patent No.: US 12,011,978 B2
(45) Date of Patent: *Jun. 18, 2024

(54) INNOVATIVE WINDSHIELD SUNSHADES CONFIGURATION AND SELECTION PROCESS

(71) Applicant: Rohan Vishnubhai Patel, Bensalem, PA (US)

(72) Inventor: Rohan Vishnubhai Patel, Bensalem, PA (US)

(73) Assignee: RVP1987 LLC, Bensalem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/715,775

(22) Filed: Sep. 26, 2017

(65) Prior Publication Data
US 2018/0194204 A1    Jul. 12, 2018

Related U.S. Application Data

(60) Provisional application No. 62/530,999, filed on Jul. 11, 2017.

(51) Int. Cl.
    *B60J 1/20*      (2006.01)
    *E06B 9/24*      (2006.01)

(52) U.S. Cl.
    CPC ............ *B60J 1/2011* (2013.01); *B60J 1/2091* (2013.01); *E06B 9/24* (2013.01); *E06B 2009/2488* (2013.01)

(58) Field of Classification Search
    CPC ........ B60J 1/2091; B60J 11/08; B60J 1/2011; B60J 11/00; B60J 1/025; E06B 9/24; E06B 2009/2488; G06Q 30/06; G06Q 30/08; B65B 13/345; B65B 13/34

USPC .................................................. 705/26.1–27.2
See application file for complete search history.

(56) References Cited

U.S. PATENT DOCUMENTS

| | | | | |
|---|---|---|---|---|
| 1,806,836 A | * | 5/1931 | Armistead | B65B 13/345 140/93.4 |
| 3,899,818 A | * | 8/1975 | Castaneda | B23P 6/00 29/243.56 |
| 4,815,784 A | * | 3/1989 | Zheng | B60J 1/2091 160/329 |
| 5,024,262 A | * | 6/1991 | Huang | B60J 11/08 160/329 |
| 5,035,460 A | * | 7/1991 | Huang | B60J 11/08 296/95.1 |
| 5,233,730 A | † | 8/1993 | Milne | |
| 5,275,460 A | † | 1/1994 | Kraus | |

(Continued)

OTHER PUBLICATIONS

From Wayback Machine website dating back to Apr. 30, 2015—https://web.archive.org/web/20150430053603/http://costcocouple.com:80/winplus-3-piece-auto-sunshade-kit/.*

(Continued)

*Primary Examiner* — Abe Massad

(57) ABSTRACT

Disclosed is improved sunshade over the prior art, by adding additional strength with a Zig-Zag clamping mechanism for connecting and securing the two endpoints of each flexible oval shaped loops to allow flexibility and strength. And still utilizing materials that add superior reflective and insulating properties, plus an optional stronger vinyl backing for cosmetic appeal. Allowing the sunshade the durability and strength to stay in position during its use.

15 Claims, 8 Drawing Sheets

(56) References Cited

U.S. PATENT DOCUMENTS

| | | | | |
|---|---|---|---|---|
| 5,452,934 | A | † | 9/1995 | Zheng |
| 5,553,908 | A | * | 9/1996 | Shink .................... B60J 11/08 160/370.21 |
| 5,845,697 | A | * | 12/1998 | Zheng .................... E04H 15/40 160/370.21 |
| 6,120,505 | A | † | 9/2000 | Huebner |
| 8,365,799 | B2 | † | 2/2013 | Harris |
| 2004/0111276 | A1 | * | 6/2004 | Inge .................... G06Q 10/087 702/155 |
| 2005/0171867 | A1 | * | 8/2005 | Doonan ................ G06Q 10/10 705/26.4 |
| 2008/0103913 | A1 | * | 5/2008 | Leach ................ G06Q 30/0631 705/26.7 |
| 2008/0243556 | A1 | * | 10/2008 | Hogan .................. G06Q 10/20 705/4 |
| 2009/0019008 | A1 | * | 1/2009 | Moore .................. G06Q 30/02 |
| 2011/0010276 | A1 | † | 1/2011 | Bowser et al. |
| 2011/0161182 | A1 | * | 6/2011 | Racco .................. G06Q 30/06 705/14.73 |
| 2011/0302167 | A1 | * | 12/2011 | Vailaya .............. G06Q 30/0601 707/737 |
| 2012/0073770 | A1 | * | 3/2012 | Zheng .................... E06B 9/24 160/377 |
| 2016/0217514 | A1 | * | 7/2016 | Greer ................ G06Q 30/0611 |
| 2017/0132586 | A1 | * | 5/2017 | Kolton ................ G07F 17/0014 |

OTHER PUBLICATIONS https://web.archive.org/web/20140326235212/http://costcocouple.com/winplus-3-piece-auto-sunshade-kit/ - year 2014.* https://web.archive.org/web/20140605130559/http://www.auto-geek.net:80/eclipse/eclipsenissan.htm.* https://web.archive.org/web/20161024193809/http://costcocouple.com:80/winplus-3-piece-auto-sunshade-kit/#.* wholesalecarcovers.com, Howard Beach,NY 11414 www.wholesalecarcovers.com/Elite%20Car%Sizing.html Published Mar. 1, 2010, visited Dec. 16, 2018.†

Amazon.com: Shade-It Car Windshield Sun Shade, 13 pages, first available Oct. 1, 2015, retrieved Oct. 31, 2018, available at https://www.amazon.com/Shade-Car-Windshield-Sun-Shade/dp/B07C85G4XX.†

Amazon.com: Car Windshield Sun Shade, 12 pages, first available Jul. 10, 2016, retrieved Oct. 19, 2018, available at https://www.amazon.com/dp/B01I90VP0G.† ebay.com: New Winplus Sunshade 3 Piece Kit Standard, 4 pages, retrieved Nov. 6, 2018, available at https://www.ebay.com/itm/NEW-Winplus-Sunshade-3-Piece-Kit-Standard-30-x-57-SEALED/163315619491.†

Auto Geek, Eclipse Sun Shade—Web page at <https://www.autogeek.net/ecsun.html>, 2 pages, published on Sep. 22, 2004, retrieved from Internet Archive Wayback Machine at <https://web.archive.org/web/20040922033827/https://www.autogeek.net/ecsun.html on Aug. 8, 2018>.†

Auto Geek Sunshade Nissan Size Chart, Web page at <http://www.auto-geek.net:80/eclipse/eclipsenissan.html>, 3 pages, published on Dec. 13, 2007 retrieved from Internet Archive Wayback Machine at <https://web.archive.org/web/20071213185513/http://www.auto-geek.net:80/eclipse/eclipsenissan.htm> on Aug. 8, 2018.†

Amazon.com: Max Reflector Standard Accordion Shade: Automotive—Web page at <https://www.amazon.com/Max-Reflector-Standard-Accordion-Shade/dp/B000CAINDE>, 10 pages, retrieved on Nov. 7, 2017.†

Auto Geek, Eclipse Sun Shade Audi Chart—Web page at <http://www.autogeek.net:80/eclipseaudi.html>, 2 pages, published on Sep. 21, 2004, retrieved from Internet Archive Wayback Machine <https://web.archive.org/web/20040921085144/http://www.autogeek.net:80/eclipseaudi.html> on Aug. 8, 2018.†

Auto Geek, Eclipse Sunshade—Web page at <https://www.autogeek.net/ecsun.html>, 3 pages, published on Sep. 8, 2005, retrieved from Internet Archive Wayback Machine at <https://web.archive.org/web/20050908221731/https://www.autogeek.net/ecsun.html> on Aug. 8, 2018.†

Auto expressions sunshade size chart—Web page at <http://dikutu.ru/auto-expressions-sunshade-size-chart/>, 2 pages, Mar. 10, 2014, retrieved on Nov. 7, 2017.†

Winplus 3-Piece Auto Sunshade Kit—Web page at <http://costcocouple.com/winplus-3-piece-auto-sunshade-kit/>, 6 pages, published on Mar. 26, 2014, retrieved from Internet Archive Wayback Machine at <https://web.archive.org/web/20140326235212/http://costcocouple.com/winplus-3-piece-auto-sunshade-kit/> on Nov. 7, 2017.†

Non-patent publication ?Retractable Auto Sun Shade?, available at https://www.improvementscatalog.com/retractable-auto-sun-shade/10242, was published on May 9, 2012. See Screenshot.†

\* cited by examiner
† cited by third party

The vehicles that takes a SMALL size Sunshade

| Brand | vehicle information |
|---|---|
| Chevrolet | Camaro(10-18); Blazer/S10(82-94); Cavalier(82-94); Corvette(84-96); HHR(06-11) |
| Ford | Mustang(79-14); Mustang(79-14); Thunderbird(02-05) |
| Honda | Element(03-11); S2000(99-10) |

INNOVATIVE WINDSHIELD SUNSHADES CONFIGURATION AND SELECTION PROCESS

CROSS-REFERENCE TO RELATED APPLICATION

This application claims the benefit of U.S. Provisional Application No. 62/376,708 filed on Aug. 18, 2016, and U.S. Provisional Application No. 62/530,999 filed on Jul. 11, 2017, which is incorporated by reference herein.

FIELD OF INVENTION

The present invention relates to sunshades with a clamping mechanism. More specifically The sun shades for protecting the interior of vehicles against the harmful effects of prolonged exposure to the sun.

BACKGROUND

In the past, sun shades have been used to shield the interior of a car from sunlight and heat. Sunshades have also been used to provide a cover for visually concealing the contents of the passenger compartment. One example of a prior art sunshades is a simple cardboard sheet that is folded in an accordion-like fashion. These folding cardboard shades are typically unfolded and placed across the front sunshade of a car. Unfortunately, these prior art sunshade shades have a tendency to contract toward the initial folded position because of the creases in the cardboard. Additionally, even when fully folded, the accordion shades are somewhat bulky to pack and store.

As shown in FIG. 1A-AC, Conventionally, sunshades 1 have a pair of closed loop flexible frames 2 that are covered and coupled by two opaque sheets of fabric material (not shown). The closed loop has two endpoints, which are fastened with a connector or fastener 3. The each closed loop has one fastener 3 for connecting the end points of each closed loop. These fasteners are not capable of holding the two end points of the closed loop for a long duration. When the fastener is damaged, then either of the two ends of closed loop comes out and damage the sunshade and Sunshade of the vehicle. These types of sunshades also have a hinge area that separates the frames, and thereby allows the frames to be placed on top of each other in order to twist and fold them into a plurality of smaller concentric loops which can be stored. Unfortunately, these prior art collapsible sunshades cannot cover a plurality of windows. Consequently, it is desirable to have a cost-efficient sunshade which has efficient clamping mechanism and saves cloth/metal needed in a construction of a Sunshade shade which otherwise would have wasted with conventional designs.

SUMMARY

It should be understood that this disclosure is not limited to the particular systems, and methodologies described herein, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

The present invention is directed to providing an improved sunshade over the prior art, by adding additional strength with a Zig-Zag pattern clamping mechanism for connecting and securing the two endpoints of each flexible oval shaped loops to allow flexibility and strength. And still utilizing materials that add superior reflective and insulating properties, plus a stronger vinyl backing for cosmetic appeal. Allowing the sunshade the durability and strength to stay in position during its use.

The sunshade is comprised of three layers, one being the reflective insulating material on the outside, to block the suns rays and protecting the interior of the vehicle from heat and sun damage. The second layer consists of at least two flexible oval shaped loops made of flexible material (for e.g a flexible metal strip or wire, spring metal and the like), each flexible oval shaped loops includes two endpoints connected by a Zig-Zag pattern clamping mechanism. The at least two flexible oval shaped loops placed in proper support locations in the sunshade. With the final layer being the vinyl backing seen from the interior of the vehicle, giving a cleaner cosmetic look to sunshades.

With the added strength given by a Zig-Zag patternclamping mechanism to the sunshade can be folded in half and will back to its original position. Keeping the sunshade from folding over in extreme heat and extended use, thus allowing the sunshade superior durability over time.

It is an objective of the present invention to provide a Zig-Zag clamping mechanism can locate on each flexible oval shaped loops at the offset position to one another. Results in a ZIG ZAG kind clamping which bends the outer sleeve and a flexible metal wire placed in the oval-shaped closed loops a bit in a ZIG-ZAG manner so the strength of it doesn't weaken over the time period.

It is an objective of the present invention to provide a sunshade having at least two flexible oval shaped loops instead of round which helps to make a sunshade for taller glasses with the lesser material because ovals are taller and narrower in width. Thus require lesser width. The shade for taller sunshades also becomes more compact and user-friendly with ovals instead of circles.

It is an objective of the present invention to provide a method for selecting a Sunshade based on their vehicle by using a size chart. The sunshade dimensions can be pre-measured and have a chart where customers can find a size according to their maker, model and year of their vehicle. The size chart has details about every vehicle which includes, maker (manufacture), model and year. So that customers can choose the Sunshade correctly.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a complete understanding of the present invention, reference is now made to the following descriptions taken in conjunction with the accompanying drawing, in which.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Some embodiments of this invention, illustrating all its features, will now be discussed in detail with respect to FIGS. 2-6.

Figure 1:
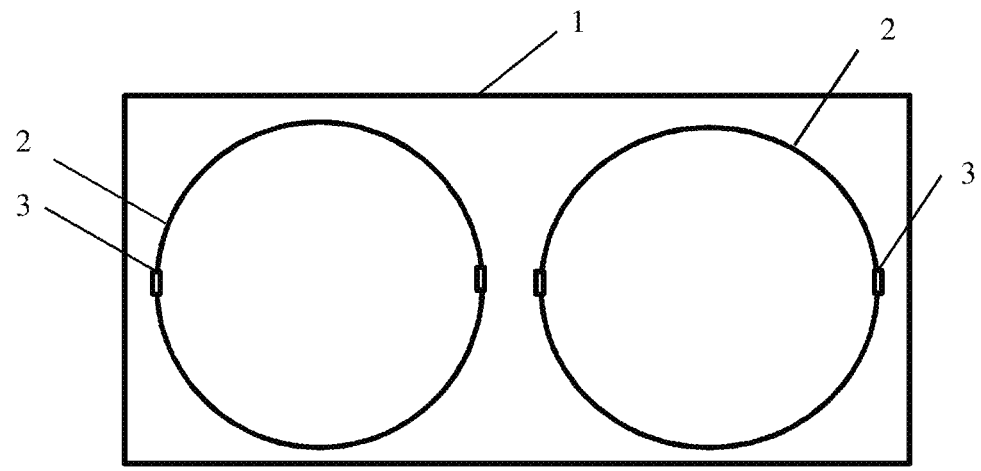
FIG. 1A-C is a prior art a sunshade having circular closed loops and conventional clamping mechanism, according to the various embodiments of the present invention.
Figure 1:
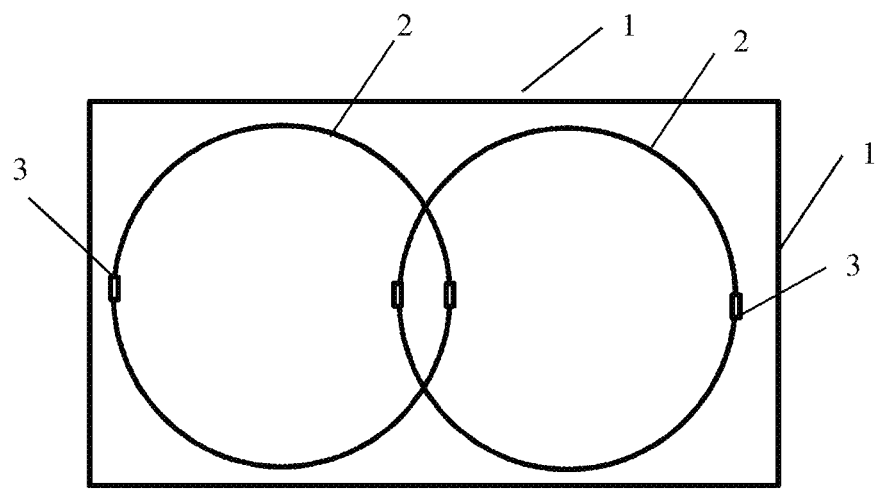
Figure 1:
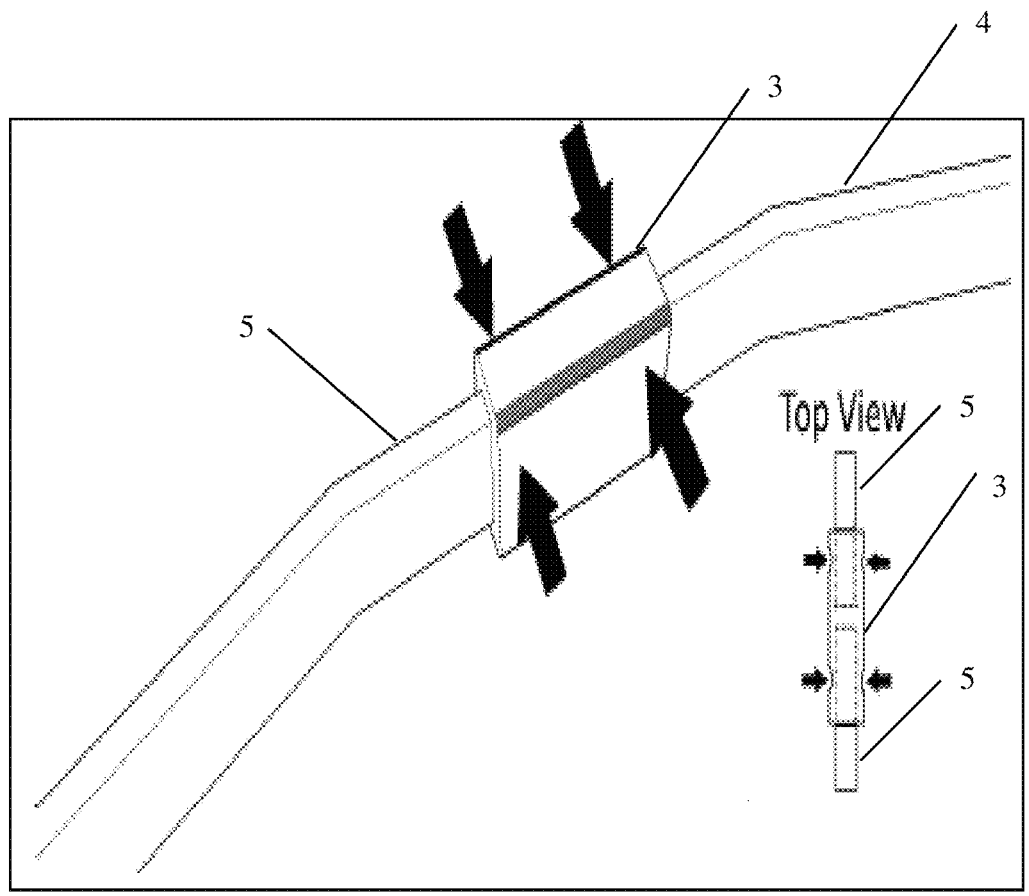
Figure 2A:
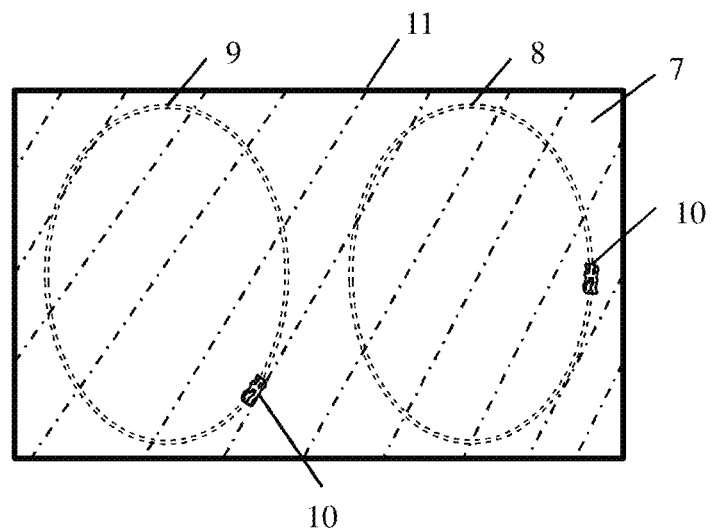
FIG. 2A-B illustrates a sunshade a having oval shaped closed loops and a Zig-Zag clamping mechanism for connecting the endpoints of the flexible oval shaped loops, according to the various embodiments of the present invention.
Figure 2:
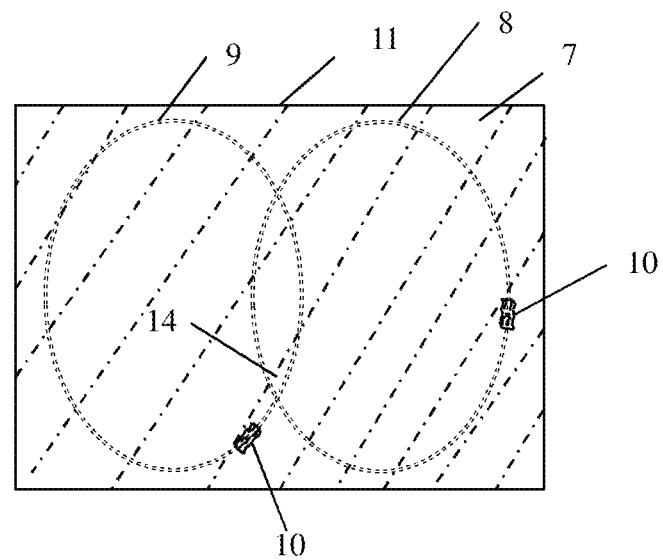

As shown in FIG. 2, a sunshade 11 is formed by a pair of resilient loop members 9 and 10 forming oval shape frames. The flexible loop members are retained in position by a peripheral loop portion of fabric 7 which includes an internal loop retaining structure. The fabric 7 is not in tension, but the fabric portion within the loop members 9 and 8 may be in tension. As an example, a pair of resilient loop members 8 and 9 forming oval shape frames may be provided by mechanically fastening (stitching), fusing, or gluing so that the loop frame members 8 and 9 are retained in position. The sunshade 11 is comprised of three layers (not shown), one being the reflective insulating material on the outside, to block the suns rays and protecting the interior of the vehicle from heat and sun damage. The second layer consists of at least two flexible oval shaped loops 8 and 9 made of flexible material (for e.g. a flexible metal strip or wire, spring metal, flexible steel and the like), each flexible oval shaped loops 8 and 9 include two endpoints connected by a Zig-Zag clamping mechanism or device 10. The at least two flexible oval shaped loops 10 placed in proper support locations in the sunshade. With the final layer being the vinyl backing seen from the interior of the vehicle, giving a cleaner cosmetic look to sunshades.

Although the loops 9 and 8 are described as formed of flexible steel and other resilient material such as plastics, spring may be used. The term fabric is to be given its broadest meaning and may include woven fabrics, sheet fabrics or even films.

As an exemplary embodiment, If we use the pair of oval sunshade shades as shown in FIG. 2 to be taller, lots of cloth wasted in overlap to make their use possible in narrow cars can be saved. The two oval-shaped sunshade shades are 33" in height, but only 26" in width (approx.)

So the total length of this shade is 1.5"+26"+2"+26"+ 1.5"=57"

Minimum width possible for narrow cars with taller windshield=26"+26"−2(2")=48"

The total dimensions of a shade=57"X38"=about 33% savings in cloth material and 25% savings in length needed to make the metal circle.

This gives the versatility of taller sunshade shade in a compact design without making it bulky and costly in manufacturing cost thus retail cost.

Figure 3:
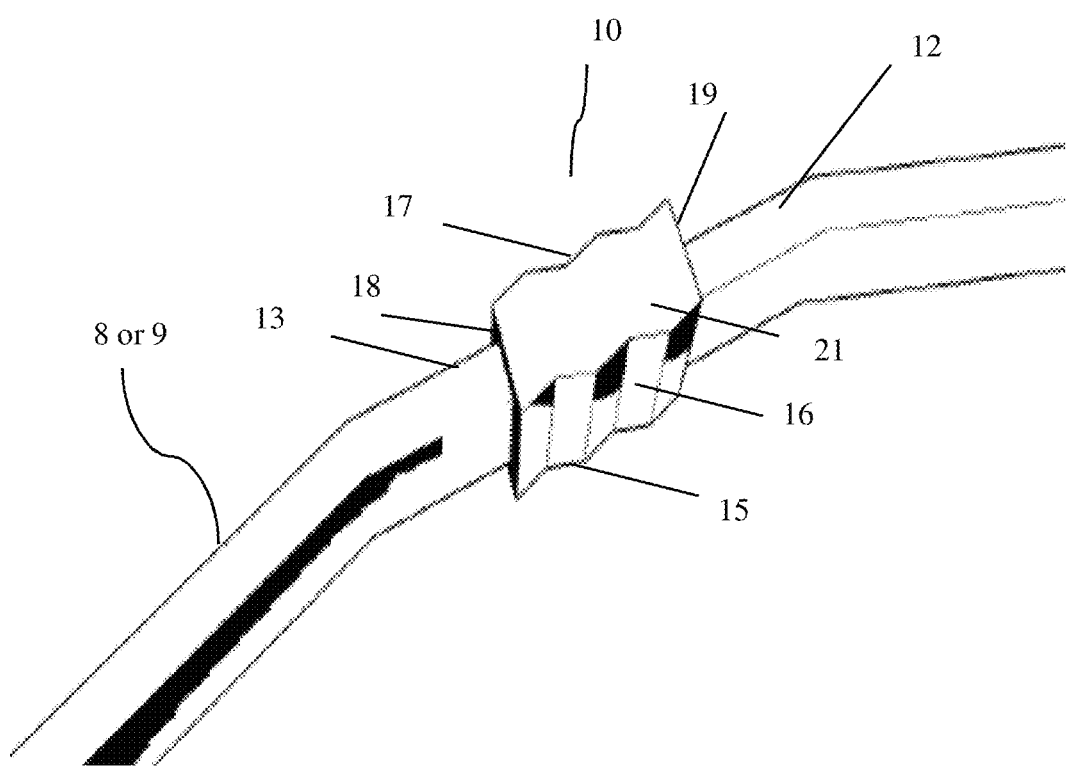
FIG. 3A-B, 4A, 4B illustrate an isometric and top view of a Zig-Zag clamping mechanism for connecting the endpoints of the flexible oval shaped loops, according to the various embodiments of the present invention.
Figure 3:
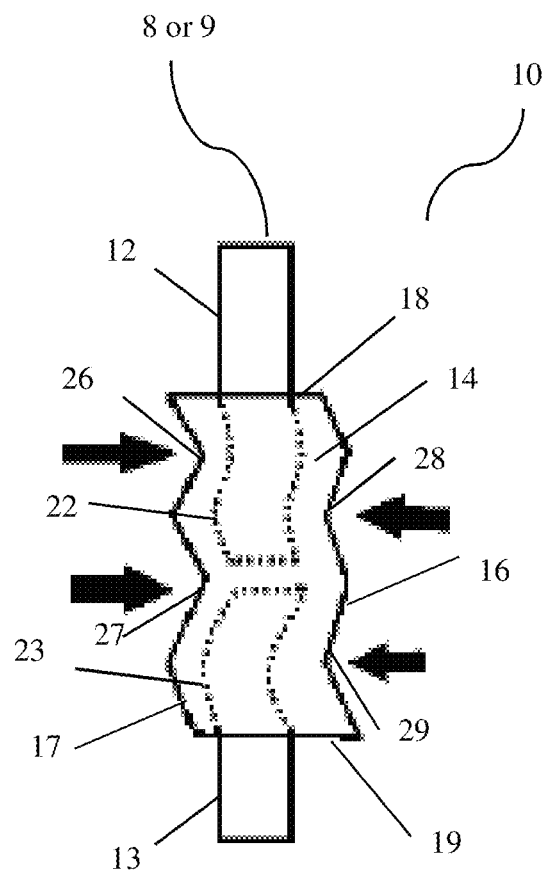
Figure 4:
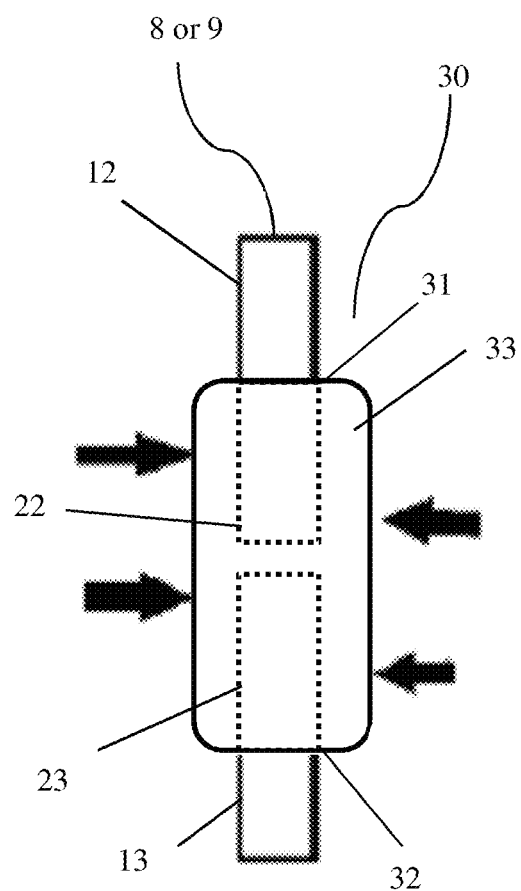
Figure 4:
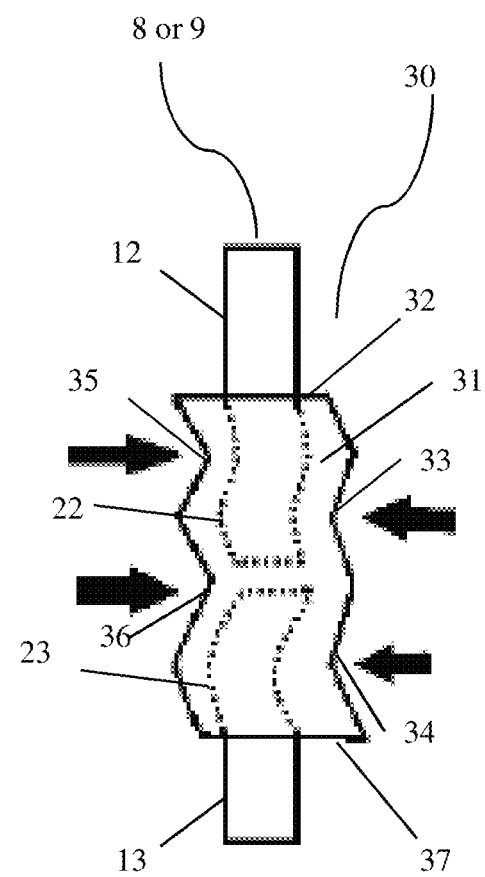

FIG. 3A-B illustrates a specific clamping pattern 10 with two adjacent opposite pressing points bending the metal covering and securing the first end point and the second end point within. As shown in FIG. 3B the flexible oval-shaped loop 8 and 9 comprised of a flexible steel flat wire's first end point 22 and a second end point 23 secured firmly by pressing the metal covering with pressing points 26, 28, 27, 29, wherein each of the two pressing points of the first wall 16 are at offset to respective pressing points pressing against a second wall 17. Clamping with two opposite adjacent pressing points at offset to one another, it causes bending of a straight piece of material and having the first endpoint 22 and second ends point 23 of the straight piece held together by the metal clamping covering 10 and outer portion of 12 and 13 of first and second endpoint are securely held. The ends of the frame 11 could be held in a rigid position, but as shown in FIG. 3, ends points 22 and 23 of the frame 9 and 8 may be received within clamping covering 10 and formed flexible oval shaped loops 10 and thereby facilitates the manufacture of the Sunshade and allow for some flexibility and stronger clamping strength. The top surface 21 and the bottom surface 15 are two covering thickness sides of the metal covering.

In one embodiment of the present invention, FIG. 3A-B shows a clamped metal covering, which is used to securely hold the endpoints 22 & 23 of the flexible oval-shaped loop 8 and 9 within the sunshade 11. The clamping method includes at least one flexible loop member 8 and 9 having a first endpoint 22 and a second endpoint 23. Further, the clamped metal covering 10 includes a metal covering enclosure with a two pressing points 28 & 29 of a first side wall 16 and pressing points 26 & 27 of a second side wall 17 being offset to one another.—a top surface 21 and a bottom surface 15 are two thickness sides of the metal covering. A front wall 18 having a first inlet section for securely receiving the first endpoint 22 of the flexible loop member 8 or 9 and an rear wall 19 having a second inlet section for receiving the second endpoint 23 of the flexible loops member 8 or 9, wherein the metal covering enclosure, when clamped with pressing points 26, 27, 28 and 29, is adapted to connect the first endpoint 22 and the second endpoint 23 of the flexible loop member in tight and securely manner.

In another embodiment of the present invention, the first side walls 16 and second wall 17 are adapted to bend slightly inside the enclosure whenever received an external force is applied on pressing points 26, 27, 28, and 29 (as shown in FIG. 3B) located off set on the first side walls. And as result of the external force, the first side walls 16 and second wall 17 are adapted to bend the first endpoint 22 and second endpoint 23 inside the enclosure for creating a tight grip. The first endpoint 22 includes a first partial portion of the flexible loop member 8 or 9 connected to the first endpoint 22, which is inserted along with the first endpoint 22 into the enclosure through the first inlet section located at front wall 18. Similarly, the second endpoint 23 includes a second partial portion of the flexible loop member 9 or 8 connected to the second endpoint 23, which is inserted along with the second endpoint into the enclosure through the first inlet section located at rear wall 19.

FIGS. 4A and 4B shows another embodiment of the present invention, the FIG. 4A illustrate a flexible loop member clamped by a metal covering clamping 30. The metal clamping covering 30 a enclosure sleeve 31 includes a front opening 32 for receiving the first end point 12 of the flexible loop member 8 or 9 and a rear opening for receiving second end point 13 of the flexible loop member 8 or 9. The enclosure sleeve 31 is made of metal. The enclosure sleeve 30 includes opposite pressing points 33, 34, 35 and 36 placed offset to one another, wherein the enclosure sleeve 30 being pressed at the opposite pressing points 33, 34, 35 and 36 resulting in a Zig-Zag pattern structure formation at opposite pressing points 33, 34, 35 and 36 with two opposite adjacent pressing points being at offset to one another results in bends in the first endpoint 12 and second endpoint 13 in a zig-zag manner within the enclosure sleeve as shown in FIG. 4B. The enclosure sleeve 30 is adapted to connect the first endpoint and the second endpoint of the flexible loop member in a tight and secure manner.

Figure 5:
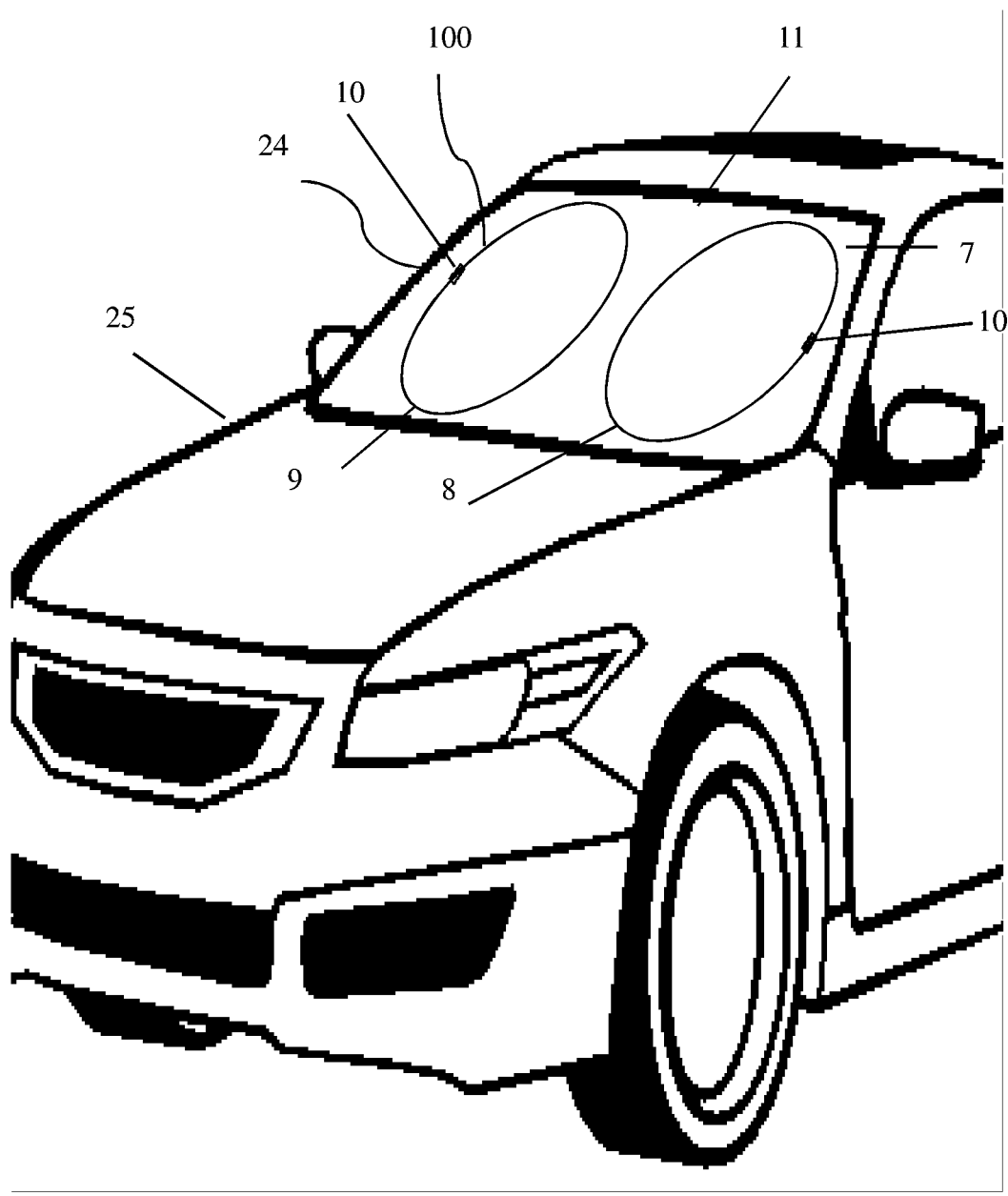
FIG. 5 illustrates a sunshade attached inside the windshield of the vehicle, according to the various embodiments of the present invention.
Figure 6:
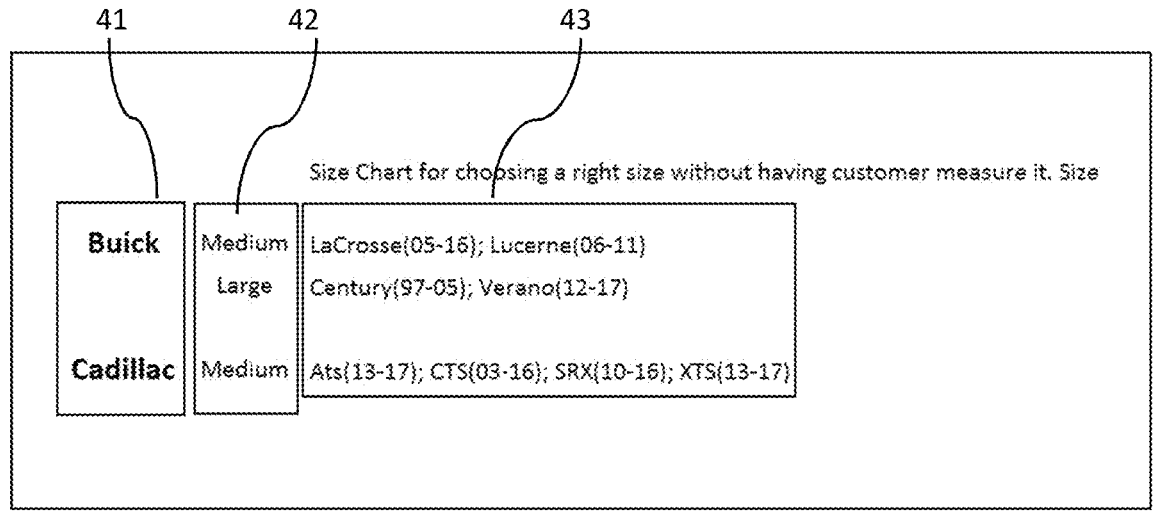
FIGS. 6A and 6B illustrates a sizing chart which helps the customer to choose sunshade based on their vehicle, according to the various embodiments of the present invention.

As shown in FIG. 5 the sunshade 11 may be positioned behind a windshield 24 of a vehicle 25.
The sunshade is held in position by a window frame and the sunshade 20 is positioned between a dashboard and a roof of the vehicle 25. Visors and rear view mirror may be used to help retain the sunshade 11 in position.

FIG. 5 illustrating the sunshade 11 in the dotted position being retained behind the windshield 24 between the dashboard (not shown) and held in position by the visors (not shown) and rear view mirror member (not shown). It is to be appreciated that the sunshade 11 may also be left in a reclining position against the steering wheel (not shown) to provide some protection against the sun rays, but the preferred position is as shown in dotted line in FIG. 4.

In another embodiment of the present invention, the present provides a sunshade having at least two flexible loop member 8 or 9 for defining two separate oval shaped loops 9 or 8 connected by an overlapping portion acting as a hinge portion. A fabric 7 for substantially covering the two oval-shaped loops 8 or 9. Further separate fabric can be used for substantially covering the two oval-shaped loops 8 or 9 and sewed or attached together. The two separate oval-shaped loops 8 or 9 substantially supporting the fabric 7 in particular areas to provide for loop portions of the fabric maintained in the open position. The at least two separate oval shaped flexible loops 8 or 9 are being used to cover a driver side windshield window and a passenger side winshield window separately and are not connected by fabric. The flexible loop member has spring like properties. Further, the flexible loop member 8 or 9 may include "out of round" shape.

Now in FIG. 6A-B, another embodiment of the present invention, the present invention provides a sizing instrument or chart for selecting a Sunshade based on their vehicle. The Sunshade dimensions can be pre-measured and have a chart where customers can find a size according to their maker, model and year of their vehicle. The sizing instrument or chart has details about every vehicle which includes, maker (manufacture), model and year. So that customers can choose the Sunshade correctly. The sizing instrument helps the customer or user for selecting a sunshade based on their vehicle information. The sizing instrument includes a first section 41 which display at least one brand name, a second section 42 which display at least one model information of the vehicle, and a third section 43 which display at least on vehicle information which includes model year based on information displayed on the first section and the second section as shown in FIG. 6A. Further, the sizing instrument display at least one vehicle information related to a particular size. Further, the vehicle information include, but not limited to brand name, manufacture and manufacture details, model year, model information, color, size of windshield or other window and the like.

The present invention provides an automobile sunscreen/Sunshade in which two or more adjacent fabrics covered oval shaped loops provide for an elongated shaped screen so as to conform to the shape of the automobile Sunshade or another window. To achieve the collapsed state, the Sunshade is first folded in half and then twisted and folded further, causing the loops to collapse within themselves, which forms a much smaller series of concentric loops and layers of fabric.

Although specific embodiments and certain structural arrangements have been illustrated and described herein, it will be clear to those skilled in the art that various other modifications and embodiments may be made incorporating the spirit and scope of the underlying inventive concepts and that the same is not limited to the particular methods and structure herein shown and described except insofar as determined by the scope of the appended claims.

What is claimed is:

1. An automobile sunshade compatibility guidance method for an automobile sunshade having at least one flexible steel flat wire loop member, the guidance method providing compatibility guidance for at least two vehicle models, the guidance method comprising:
   a. providing a guidance chart for at least one size of the automobile sunshade, wherein the guidance chart displays the at least two vehicle models next to one another;
   b. providing the automobile sunshade in the at least one size thereof, the automobile sunshade comprising the at least one flexible steel flat wire loop member and a fabric to which the at least one flexible steel flat wire loop member is secured;
      wherein each of the at least one flexible steel flat wire loop member consists of a first end and a second end of a flexible steel flat wire secured by a pressed metal covering with opposite pressing points, the metal covering having two covering width surfaces and two covering thickness surfaces, each of the two covering width surfaces being larger than each of the two covering thickness surfaces;
      wherein at least two of the opposite pressing points on the two covering width surfaces are configured to protrude into a space defined within the metal covering to secure the first end and the second end, wherein the opposite pressing points contact and deform the first end and/or the second end, wherein; the metal covering secures the first end and the second end of the flexible steel flat wire within the space without overlapping of the first end and the second end, wherein the first end and the second end do not contact each other within the metal covering, and the metal covering substantially entirely surrounds a perimeter of each of the first end and the second end;
      wherein at least one of the opposite pressing points is disposed on at least one of the two covering width sides and at least another of the opposite adjacent pressing points is disposed on at least another of the two covering width sides;

wherein the automobile sunshade is configured to be twisted and folded further to cause the at least one flexible steel flat wire loop member to collapse within itself to form a collapsed state.

2. The automobile sunshade guidance method according to claim 1, wherein the at least one size comprises a total of two flexible steel flat wire loop members secured to the fabric, such that the fabric is positioned within each of the two flexible steel flat wire loop members.

3. The automobile sunshade guidance method according to claim 2, wherein each of the at least two flexible steel flat wire loop members of the automobile sunshade are oval-shaped.

4. The automobile sunshade guidance method according to claim 3, wherein each of the two flexible steel flat wire loop members of of the automobile sunshade is oriented such that along axis of each oval shape is oriented parallel to a height of a windshield.

5. The automobile sunshade guidance method according to claim 2, wherein each of the two flexible steel flat wire loop members of the automobile sunshade is mechanically retained in position in the sunshade by attachment to the fabric.

6. The automobile sunshade guidance method according to claim 2, wherein the fabric within each of the at least two flexible steel flat wire loop members is in tension.

7. The automobile sunshade guidance method according to claim 1, wherein the at least one size of the automobile sunshade offered is for a window of one of the vehicle models displayed in the chart.

8. The automobile sunshade guidance method of claim 1, wherein the fabric has a fabric width, a fabric height and a fabric thickness, wherein both the fabric width and the fabric height are greater than the fabric thickness, wherein the at least one flexible steel flat wire loop member is sewed on to the fabric in an orientation in which the two wire width sides stay substantially perpendicular to the fabric height and the fabric width when the interior window sunshade is in an extended state.

9. An automobile sunshade compatibility guidance method for at least two vehicle models, the guidance method comprising:

a. providing a guidance chart for at least one size of an automobile sunshade, wherein the guidance chart displays the at least two vehicle models compatible with the at least one size of the automobile sunshade;

b. providing the automobile sunshade in the at least one size thereof, the automobile sunshade, comprising two flexible steel flat wire loop members;

wherein each of the two flexible steel flat wire loop members consists of first end and a second end of a flexible steel flat wire secured by a pressed metal covering with opposite pressing points, the metal covering having two covering width surfaces and two covering thickness surfaces, each of the two covering width surfaces being larger than each of the two covering thickness surfaces, wherein at least one of the opposite pressing points is disposed on at least one of the two covering width surfaces and is configured to protrude into a space defined within the metal coveting to secure the first end and the second end, wherein the opposite pressing points contact and deform the first end and/or the second end, wherein the metal coveting secures the first end and the second end of the flexible steel flat wire within the space without overlapping the first end and the second end, wherein the first end and the second end do not contact each other within the metal covering and the metal covering substantially entirely surrounds a perimeter of each of the first end and the second end, wherein each of the two flexible steel flat wire loop members is secured to a fabric;

wherein the automobile sunshade is configured to be twisted and folded further to cause the at least two flexible steel flat wire loop members to collapse within itself to form a collapsed state.

10. The automobile sunshade guidance method according to claim 9, wherein each of the two flexible steel flat wire loop members of the at least one size of the automobile sunshades are oval-shaped.

11. The automobile sunshade guidance method according to claim 10, wherein each of the two flexible steel flat wire loop members of the at least one of of the automobile sunshade is oriented such that along axis of each oval shape is oriented parallel to the fabric height.

12. The automobile sunshade guidance method according to claim 9, wherein the at least one size of the automobile sunshade is for a window of one of one of the vehicle models displayed in the chart.

13. The automobile sunshade guidance method according to claim 9, wherein each of the two flexible steel flat wire loop members of the at least one size of the automobile sunshade is mechanically retained in position in the sunshade by attachment to the fabric.

14. The automobile sunshade guidance method according to claim 9, wherein the fabric is secured in tension within each of the two flexible steel flat wire loop members.

15. The automobile sunshade guidance method of claim 9, wherein the fabric has a fabric width, a fabric height and a fabric thickness, wherein both the fabric width and the fabric height are greater than the fabric thickness, wherein the two flexible steel flat wire loop members are sewed on to the fabric in an orientation in which each of the two wire width sides stay substantially automobile A perpendicular to both the fabric height and the fabric width when the automobile window sunshade is in an extended state.

* * * * *